US011153294B2

(12) United States Patent
Khylkouskaya et al.

(10) Patent No.: US 11,153,294 B2
(45) Date of Patent: *Oct. 19, 2021

(54) BACKGROUND AUTHENTICATION REFRESH

(71) Applicant: salesforce.com, inc., San Francisco, CA (US)

(72) Inventors: Olga Khylkouskaya, Redwood City, CA (US); Aleksey Kolesnik, Foster City, CA (US)

(73) Assignee: salesforce.com, inc., San Francisco, CA (US)

(*) Notice: Subject to any disclaimer, the term of this patent is extended or adjusted under 35 U.S.C. 154(b) by 37 days.

This patent is subject to a terminal disclaimer.

(21) Appl. No.: 16/391,084

(22) Filed: Apr. 22, 2019

(65) Prior Publication Data

US 2019/0386979 A1 Dec. 19, 2019

Related U.S. Application Data

(63) Continuation of application No. 14/826,944, filed on Aug. 14, 2015, now Pat. No. 10,270,753.

(51) Int. Cl.
*H04L 29/06* (2006.01)
*H04L 9/32* (2006.01)
*H04L 9/08* (2006.01)

(52) U.S. Cl.
CPC ........ *H04L 63/0807* (2013.01); *H04L 9/0891* (2013.01); *H04L 9/3228* (2013.01); *H04L 63/083* (2013.01)

(58) Field of Classification Search
CPC .. H04L 63/0807; H04L 63/0815; G06F 21/41
See application file for complete search history.

(56) References Cited

U.S. PATENT DOCUMENTS

| | | |
|---|---|---|
| 5,577,188 A | 11/1996 | Zhu |
| 5,608,872 A | 3/1997 | Schwartz et al. |
| 5,649,104 A | 7/1997 | Carleton et al. |
| 5,715,450 A | 2/1998 | Ambrose et al. |
| 5,761,419 A | 6/1998 | Schwartz et al. |
| 5,819,038 A | 10/1998 | Carleton et al. |
| 5,821,937 A | 10/1998 | Tonelli et al. |
| 5,831,610 A | 11/1998 | Tonelli et al. |
| 5,873,096 A | 2/1999 | Lim et al. |

(Continued)

OTHER PUBLICATIONS

Corrected Notice of Allowance for U.S. Appl. No. 15/197,728 dated Apr. 25, 2018; 5 pages.

(Continued)

*Primary Examiner* — Dao Q Ho
(74) *Attorney, Agent, or Firm* — Jaffery Watson Mendonsa & Hamilton LLP

(57) ABSTRACT

Techniques for refreshing an authentication token. Access is granted to a secure computing environment in response to receiving authentication information from a requesting computing device. The access is granted for a session and one or more client applications allow secure delegated access to server resources on behalf of a resource owner by utilizing an access token. The access token is refreshed without explicit user interaction utilizing the authentication information for the session while the session is valid. Access is granted to the secure computing environment in response to the refreshed access token.

20 Claims, 5 Drawing Sheets

(56) References Cited

U.S. PATENT DOCUMENTS

| | | |
|---|---|---|
| 5,918,159 A | 6/1999 | Fomukong et al. |
| 5,963,953 A | 10/1999 | Cram et al. |
| 6,092,083 A | 7/2000 | Brodersen et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,135 B1 | 4/2001 | Brodersen et al. |
| 6,233,617 B1 | 5/2001 | Rothwein et al. |
| 6,266,669 B1 | 7/2001 | Brodersen et al. |
| 6,295,530 B1 | 9/2001 | Ritchie et al. |
| 6,324,568 B1 | 11/2001 | Diec |
| 6,324,693 B1 | 11/2001 | Brodersen et al. |
| 6,336,137 B1 | 1/2002 | Lee et al. |
| D454,139 S | 3/2002 | Feldcamp |
| 6,367,077 B1 | 4/2002 | Brodersen et al. |
| 6,393,605 B1 | 5/2002 | Loomans |
| 6,405,220 B1 | 6/2002 | Brodersen et al. |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans |
| 6,732,095 B1 | 5/2004 | Warshaysky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker et al. |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 6,907,546 B1 | 6/2005 | Haswell et al. |
| 7,289,976 B2 | 10/2007 | Kihneman et al. |
| 7,340,411 B2 | 3/2008 | Cook |
| 7,620,655 B2 | 11/2009 | Larsson et al. |
| 7,761,885 B2 | 7/2010 | Labrou et al. |
| 8,365,150 B2 | 1/2013 | Wong et al. |
| 8,479,144 B2 | 7/2013 | Nakatani |
| 8,640,202 B2 | 1/2014 | Roy |
| 2001/0044791 A1 | 11/2001 | Richter et al. |
| 2002/0022986 A1 | 2/2002 | Coker et al. |
| 2002/0029161 A1 | 3/2002 | Brodersen et al. |
| 2002/0029376 A1 | 3/2002 | Ambrose et al. |
| 2002/0035577 A1 | 3/2002 | Brodersen et al. |
| 2002/0042264 A1 | 4/2002 | Kim |
| 2002/0042843 A1 | 4/2002 | Diec |
| 2002/0072951 A1 | 6/2002 | Lee et al. |
| 2002/0082892 A1 | 6/2002 | Raffel et al. |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0152102 A1 | 10/2002 | Brodersen et al. |
| 2002/0161734 A1 | 10/2002 | Stauber et al. |
| 2002/0162090 A1 | 10/2002 | Parnell et al. |
| 2002/0165742 A1 | 11/2002 | Robins |
| 2003/0004971 A1 | 1/2003 | Gong et al. |
| 2003/0018705 A1 | 1/2003 | Chen et al. |
| 2003/0018830 A1 | 1/2003 | Chen et al. |
| 2003/0066031 A1 | 4/2003 | Laane |
| 2003/0066032 A1 | 4/2003 | Ramachadran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker |
| 2003/0088545 A1 | 5/2003 | Subramaniam et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec |
| 2003/0189600 A1 | 10/2003 | Gune et al. |
| 2003/0191743 A1 | 10/2003 | Brodersen et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0177113 A1 | 9/2004 | Nguyen |
| 2004/0186860 A1 | 9/2004 | Lee et al. |
| 2004/0193510 A1 | 9/2004 | Catahan, Jr. et al. |
| 2004/0199489 A1 | 10/2004 | Barnes-Leon et al. |
| 2004/0199536 A1 | 10/2004 | Barnes-Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2006/0020679 A1 | 1/2006 | Hinton et al. |
| 2006/0168054 A1 | 7/2006 | Burkhart et al. |
| 2009/0177744 A1 | 7/2009 | Marlow et al. |
| 2010/0131530 A1 | 5/2010 | Gibson et al. |
| 2010/0198730 A1 | 8/2010 | Ahmed et al. |
| 2010/0306547 A1 | 12/2010 | Fallows et al. |
| 2011/0035417 A1 | 2/2011 | Cohen et al. |
| 2011/0093813 A1 | 4/2011 | Watanabe |
| 2012/0102455 A1 | 4/2012 | Ambat et al. |
| 2012/0173490 A1 | 7/2012 | Gould et al. |
| 2012/0197957 A1 | 8/2012 | Voogd |
| 2012/0239578 A1 | 9/2012 | Kang et al. |
| 2012/0266229 A1 | 10/2012 | Simone et al. |
| 2013/0086670 A1 | 4/2013 | Vangpat et al. |
| 2013/0191884 A1 | 7/2013 | Leicher et al. |
| 2014/0040991 A1 | 2/2014 | Potonniee et al. |
| 2016/0065563 A1 | 3/2016 | Broadbent et al. |

OTHER PUBLICATIONS

Final Office Action for U.S. Appl. No. 13/178,511 dated Apr. 30, 2015, 13 pages.

Final Office Action for U.S. Appl. No. 13/178,511 dated May 21, 2014, 10 pages.

Final Office Action for U.S. Appl. No. 15/197,728 dated Jul. 13, 2017, 12 pages.

Final Office Action for U.S. Appl. No. 14/826,944 dated Feb. 9; 2018, 9 pages.

Final Office Action for U.S. Appl. No. 14/826,944 dated Mar. 3, 2017, 9 pages.

Hardt, D., Ed. "The OAuth 2.0 Authorization Framework" Standards Track, Oct. 2012, 77 pages.

Non-Final Office Action for U.S. Appl. No. 13/178,511 dated Aug. 13, 2015; 11 pages.

Non-Final Office Action for U.S. Appl. No. 13/178,511 dated Oct. 10, 2014; 10 pages.

Non-Final Office Action for U.S. Appl. No. 13/178,511 dated Oct. 24, 2013, 13 pages.

(56) References Cited

OTHER PUBLICATIONS

Non-Final Office Action for U.S. Appl. No. 15/197,728 dated Dec. 29, 2016, 13 pages.
Non-Final Office Action for U.S. Appl. No. 15/197,728 dated Nov. 15, 2017, 8 pages.
Non-Final Office Action for U.S. Appl. No. 16/042,983 dated Feb. 7, 2019, 7 pages.
Non-Final Office Action for U.S. Appl. No. 14/826,944 dated Jun. 27, 2017, 8 pages.
Non-Final Office Action for U.S. Appl. No. 14/826,944 dated May 31, 2018, 10 pages.
Non-Final Office Action for U.S. Appl. No. 14/826,944 dated Nov. 16, 2016, 8 pages.
Notice of Allowance for U.S. Appl. No. 13/178,511 dated Mar. 25, 2016, 13 pages.
Notice of Allowance for U.S. Appl. No. 15/197,728 dated Mar. 28, 2018, 8 pages.
Notice of Allowance for U.S. Appl. No. 16/042,983 dated Jun. 5, 2019, 8 pages.
Notice of Allowance for U.S. Appl. No. 14/826,944 dated Dec. 11, 2018, 8 pages.
Winterfeldt, David. Simple Spring Security Webapp. 2008. Spring by Example Part IV. Web. Oct. 17, 2013.
Non-Final Office Action for U.S. Appl. No. 16/588,466 dated Jul. 8, 2020, 8 pages.

BACKGROUND AUTHENTICATION REFRESH

CLAIM OF PRIORITY

This application is a continuation of U.S. patent application Ser. No. 14/826,944, entitled "BACKGROUND AUTHENTICATION REFRESH," filed Aug. 14, 2015, now U.S. Pat. No. 10,270,753 with an issue date of Apr. 23, 2019, the contents of which are incorporated herein by reference in their entirety.

TECHNICAL FIELD

Embodiments relate to techniques for refreshing authentication tokens. More particularly, embodiments relate to techniques for generating refresh operates in the background to maintain authentication tokens without user interaction to improve the user experience in a secure environment.

BACKGROUND

Secure environments require some sort of authentication in order for a party to be authorized to access the environment. For example, in secure computing environments a user name and password is commonly required to utilize the computing environment. However, some computing environments utilize more sophisticated authentication procedures, for example, two-factor authentication, biometric authentication, OAuth. These more sophisticated authentication procedures require more input from users, which results in a more cumbersome process.

OAuth is an open standard for authorization that provides client applications a secure delegated access to server resources on behalf of the resource owner. OAuth specifies a process for resource owners to authorize third-party access to their resources without sharing credentials utilizing an access token. Access tokens can have a life time after which they expire and some reauthorization/reauthentication is required. This can be inconvenient for a user.

BRIEF DESCRIPTION OF THE DRAWINGS

Embodiments of the invention are illustrated by way of example, and not by way of limitation, in the figures of the accompanying drawings in which like reference numerals refer to similar elements.

DETAILED DESCRIPTION

In the following description, numerous specific details are set forth. However, embodiments of the invention may be practiced without these specific details. In other instances, well-known circuits, structures and techniques have not been shown in detail in order not to obscure the understanding of this description.

The techniques described herein are generally described in terms of an OAuth 2.0 framework; however, the concepts described herein are applicable to many types of authentication. The OAuth 2.0 authorization framework enables a third-party application to obtain limited access to an HTTP service, either on behalf of a resource owner by orchestrating an approval interaction between the resource owner and the HTTP service, or by allowing the third-party application to obtain access on its own behalf. The OAuth 2.0 specification can be found in Internet Engineering Task Force (IETF) Request for Comments (RFC) 6749 (tools.ietf.org/html/rfc6749).

In one embodiment, access (e.g., via API) is provided using a token that is acquired by redirecting a user to a login page. According to the OAuth 2.0 specification, the token expires after one hour (however, the exact length of time is not important). Thus, a user would have to be redirected to the login page each hour. Redirecting the user for reauthentication every hour can lead to a frustrating user experience.

In one embodiment, a silent request is utilized to accomplish reauthentication without redirecting the user. In one embodiment, a background redirect (e.g., via an asynchronous JavaScript and XML, or AJAX, call) is performed to accomplish the reauthentication without redirecting the user. In one embodiment, the silent request utilizes session information from the user, so the user does not experience any redirections when acquiring a new token.

In one embodiment, the techniques described herein can be accomplished without modification to the OAuth 2.0 flow. In one embodiment, the techniques described herein can be provided as browser (e.g., Chrome®, Internet Explorer®, Safari®, Firefox®, Edge®) extensions and/or AJAX calls and/or a sandbox. Generally speaking, a browser extension is a computer program that extends the functionality of a browser in some way. Depending on the browser and the version, the term may be distinct from similar terms such as plug-in or add-on. Some extensions are authored using web technologies such as HTML, JavaScript, and CSS.

Figure 1:
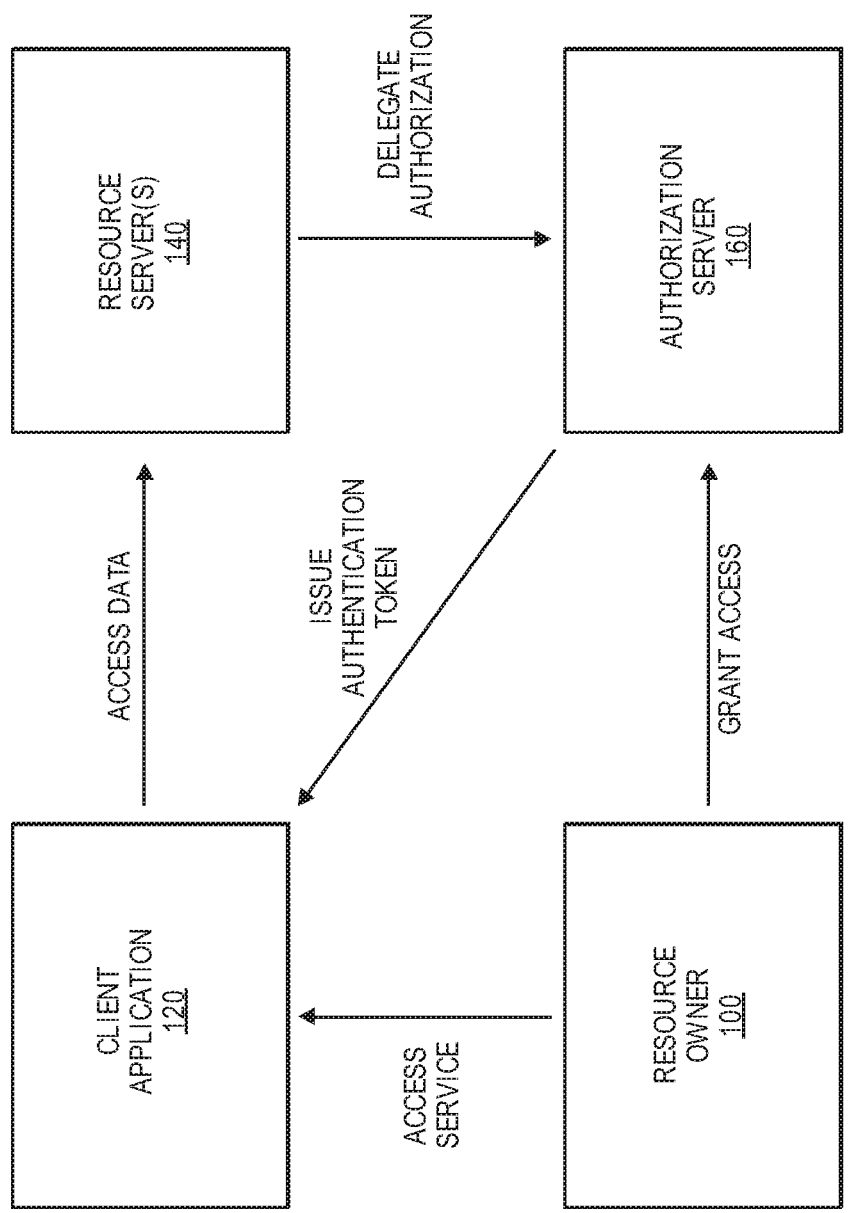
FIG. 1 is a block diagram of one embodiment of a system in which an authentication token can be utilized.

FIG. 1 is a block diagram of one embodiment of a system in which an authentication token can be utilized. The example of FIG. 1 includes resource owner 100, which can be any entity capable of granting access to a protected resource. Resource owner 100 can be, for example, an end user. Resource owner 100 accesses services/resources via client application 120, which can be, for example, an app on a mobile device, a web page accessed via a browser application, a program on a desktop/laptop computer.

Client application 120 operates to make protected requests (to access data/resources) on behalf of resource owner 100 with the authorization of resource owner 100. Resource server(s) 140 is/are the server(s) that host the protected resource and can be capable of accepting and responding to protected resource requests using access tokens. In an OAuth example, resource server 140 provides an application programming interface (API) to provide access to the protected resource.

Resource server 140 can delegate authorization to authorization server 160, which issues access/authentication tokens to client application 120 after authentication of resource owner 100. In one embodiment, the components of FIG. 1 can operate according to standard OAuth 2.0 specifications. In another embodiment, the components of FIG. 1 can operate to provide background authentication so that resource owner 100 (e.g., an end user) is not redirected to provide credentials (e.g., username and password, two-factor authentication) frequently.

In one embodiment, session information can be used as substitute credentials in refreshing access tokens during the period that the session is valid. Because sessions are typically valid for a longer period than access tokens (e.g., 3 weeks vs. 1 hour), the frequency with which a user is required to provide security information is reduced while still providing a secure environment. In one embodiment, one or more of the servers providing resources has identity/authentication information for the user from providing a session. The server(s) can use the session information to communicate with the authentication server to refresh the authentication token. This allows the user to access secure resources with an authentication token with a limited lifespan for the length of a valid session without repeatedly entering authentication/identification information to acquire/refresh the authentication token.

Figure 2:
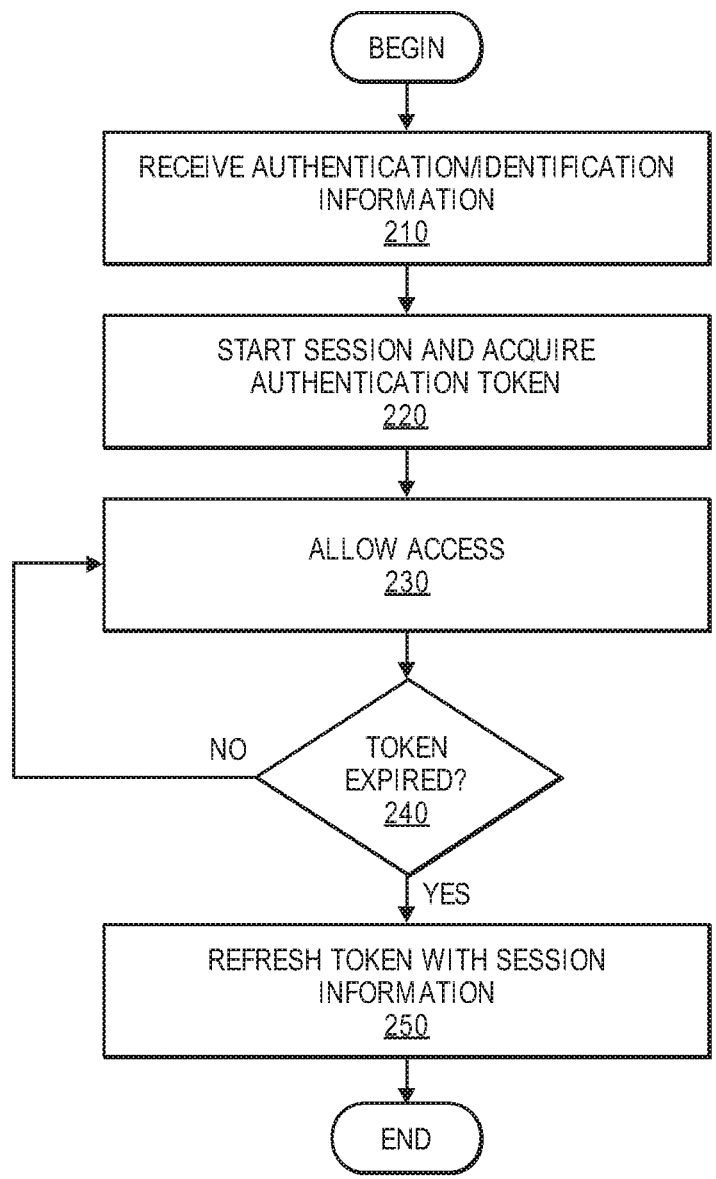
FIG. 2 is a flow diagram of one embodiment of a technique for providing background token refreshes.

FIG. 2 is a flow diagram of one embodiment of a technique for providing background token refreshes. In one embodiment, session information is utilized to provide a background authentication token refresh that is transparent to the user, which improves the user experience. In one embodiment, the session can be for an on-demand services environment, for example, a multitenant database environment. Various on-demand service environment embodiments are described in greater detail below.

Authentication information is received, 210. In one embodiment, a user can be presented with a login interface (e.g., login screen, biometric interface, multifactor authentication mechanism) through which the user can provide the requested authentication information (e.g., username and password, fingerprint, secret key). In one embodiment, the authentication information is received by the secure environment through which the user wishes to access resources, for example, the on-demand services environment mentioned above.

In one embodiment, the authentication information is used to start a session and acquire an authentication token, 220. In one embodiment, the authentication token is acquired utilizing OAuth 2.x protocols; however, other authentication protocols can also be supported in a similar manner. In one embodiment, the one or more servers within the on-demand services environment can receive the authentication information and use the authentication information to both start a session and acquire an authentication token.

With appropriate authentication information, access is allowed, 230. Access can be allowed to any secure computing environment, for example, the on-demand services environment discussed above. Access can be allowed, 230, while the authentication token is not expired, 240. When using the OAuth 2.x protocols, the tokens are valid for one hour; however, other time periods can also be supported. When the token is expired, 240, one or more computing devices within the secure environment can utilize session information (e.g., authentication information required to start a session) to acquire a refresh token, 250.

In one embodiment, a silent (or background) request is utilized to accomplish reauthentication without redirecting the user. In one embodiment, a background redirect (e.g., via an asynchronous JavaScript and XML, or AJAX, call) is performed to accomplish the reauthentication without redirecting the user. In one embodiment, the silent request utilizes session information from the user that has been provided previously (e.g., 210) to start the session, so the user does not experience any redirections when acquiring while refreshing the authentication token.

In one embodiment, the silent request is provided via a browser (e.g., Chrome®, Safari®, Firefox®, Edge®, Internet Explorer®) extension within a sandbox in order to provide a secure silent refresh. In alternate embodiments, servers within the secure environment may manage the silent requests.

Figure 3:
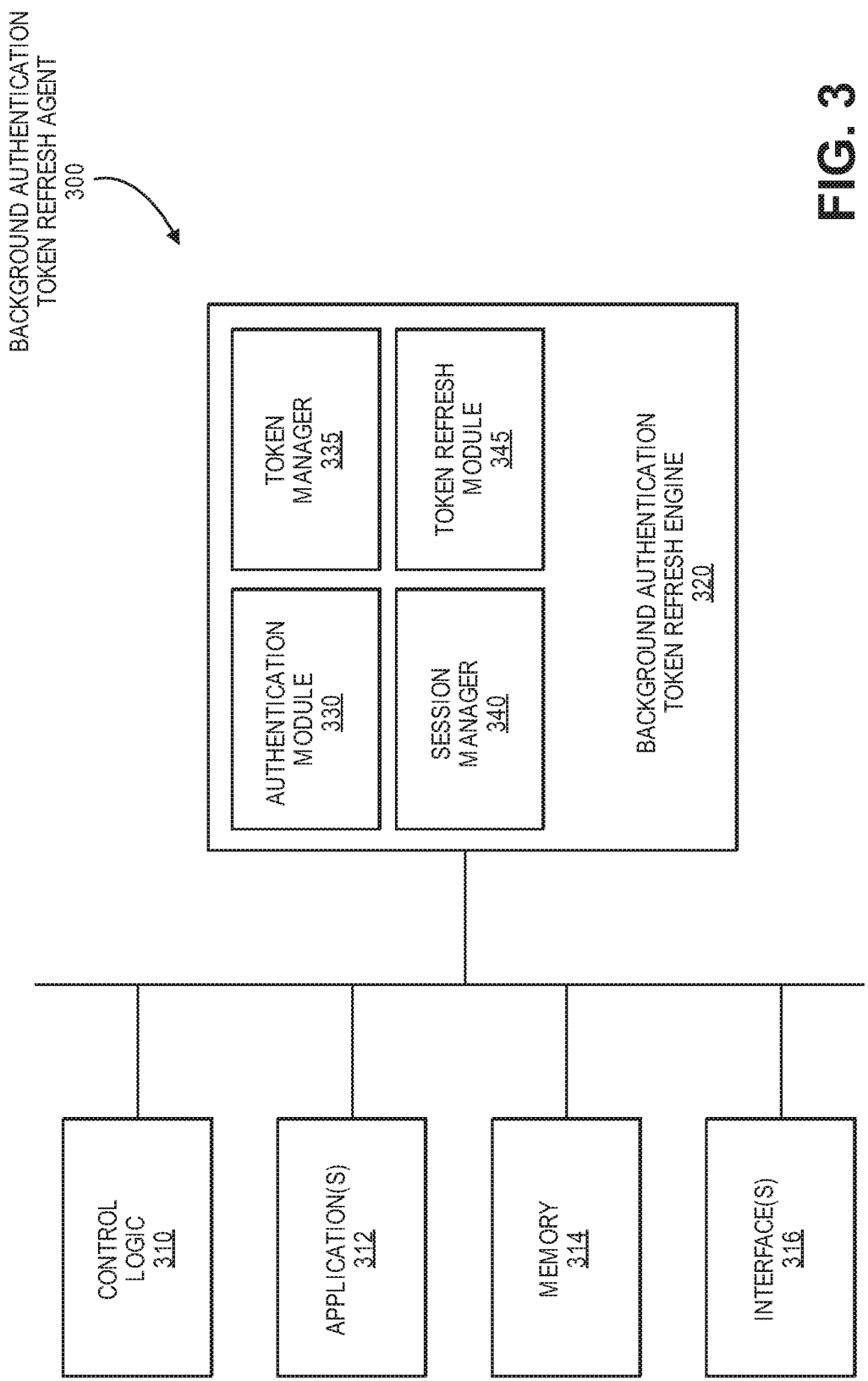
FIG. 3 is a block diagram of one embodiment of a background authentication token refresh agent.

FIG. 3 is a block diagram of one embodiment of a background authentication token refresh agent. In one embodiment, background authentication token refresh agent 300 includes control logic 310, which implements logical functional control to direct operation of background authentication token refresh agent 300, and/or hardware associated with directing operation of background authentication token refresh agent 300. Logic may be hardware logic circuits and/or software routines.

In one embodiment, background authentication token refresh agent 300 includes one or more applications 312, which represent code sequence and/or programs that provide instructions to control logic 310. Applications can provide various functional components of background authentication token refresh agent 300.

Background authentication token refresh agent 300 includes memory 314, which represents a memory device and/or access to a memory resource for storing data and/or instructions. Memory 314 may include memory local to background authentication token refresh agent 300, as well as, or alternatively, including memory of the host system on which background authentication token refresh agent 300 resides.

In one embodiment, background authentication token refresh agent 300 also includes one or more interfaces 616, which represent access interfaces to/from (an input/output interface) background authentication token refresh agent 300 with regard to entities (electronic or human) external to background authentication token refresh agent 300. Interface(s) 316 can include, for example, the various APIs utilized to perform the functionality described above and/or the user interface discussed above. Other and/or different and/or additional interfaces can also be provided.

Background authentication token refresh agent 300 also includes background authentication token refresh engine 320, which includes one or more functions or modules that enable background authentication token refresh agent 300 to provide the records management services as described above. The example of FIG. 3 provides several modules that may be included in background authentication token refresh engine 320; however, different and/or additional modules may also be included. Example modules that may be involved in providing the records management functionality include authentication module 330, token manager 335, session manager 340 and token refresh module 345. The modules of background authentication token refresh engine 320 can be hardware, software or a combination thereof.

In one embodiment, background authentication token refresh engine 320 includes authentication module 330. In one embodiment, authentication module 330 operates to receive and store authentication information from a user. In one embodiment, authentication module 330 controls/operates the interface (e.g., graphical user interface) utilized to receive the authentication information from the user. In one embodiment, authentication module includes, or has access to, secure storage for storing authentication information and/or related data.

In one embodiment, token manager 335 operates to manage the authentication token. In one embodiment, token manager 335 operates according to the OAuth 2.0 standard; however, other authentication tokens can also be supported. In one embodiment, token manager 335 includes, or has access to, secure storage for storing authentication tokens and/or related data. In one embodiment, token manager 335 operated through one or more interfaces to securely communicate with an authorization server or other device to acquire an authentication token. Token manager 335 may receive the authentication token and/or related information from the authorization server.

In one embodiment, session manager 340 operates to manage access to one or more secure resources during a session, which can have a limited life (e.g., one day, two weeks, one month, 18 hours). In one embodiment, session manager 340 includes, or has access to, secure storage for storing authentication information related to session management. In one embodiment, session manager 340 operates through one or more interfaces to securely communicate with devices within the secure environment to manage the user session.

In one embodiment, token refresh module 345 operates as described above to provide background authentication token refresh operations without user interaction. In one embodiment, all or part of token refresh module may be implemented as a browser extension to provide the functionality described herein. In one embodiment, token refresh module 345 operates according to OAuth 2 protocols and utilizing OAuth 2-compliant APIs to refresh authentication tokens without explicit user involvement. This provides the user with the security provided by authentication tokens without the overhead and inconvenience of periodic manual reauthentication procedures.

Figure 4:
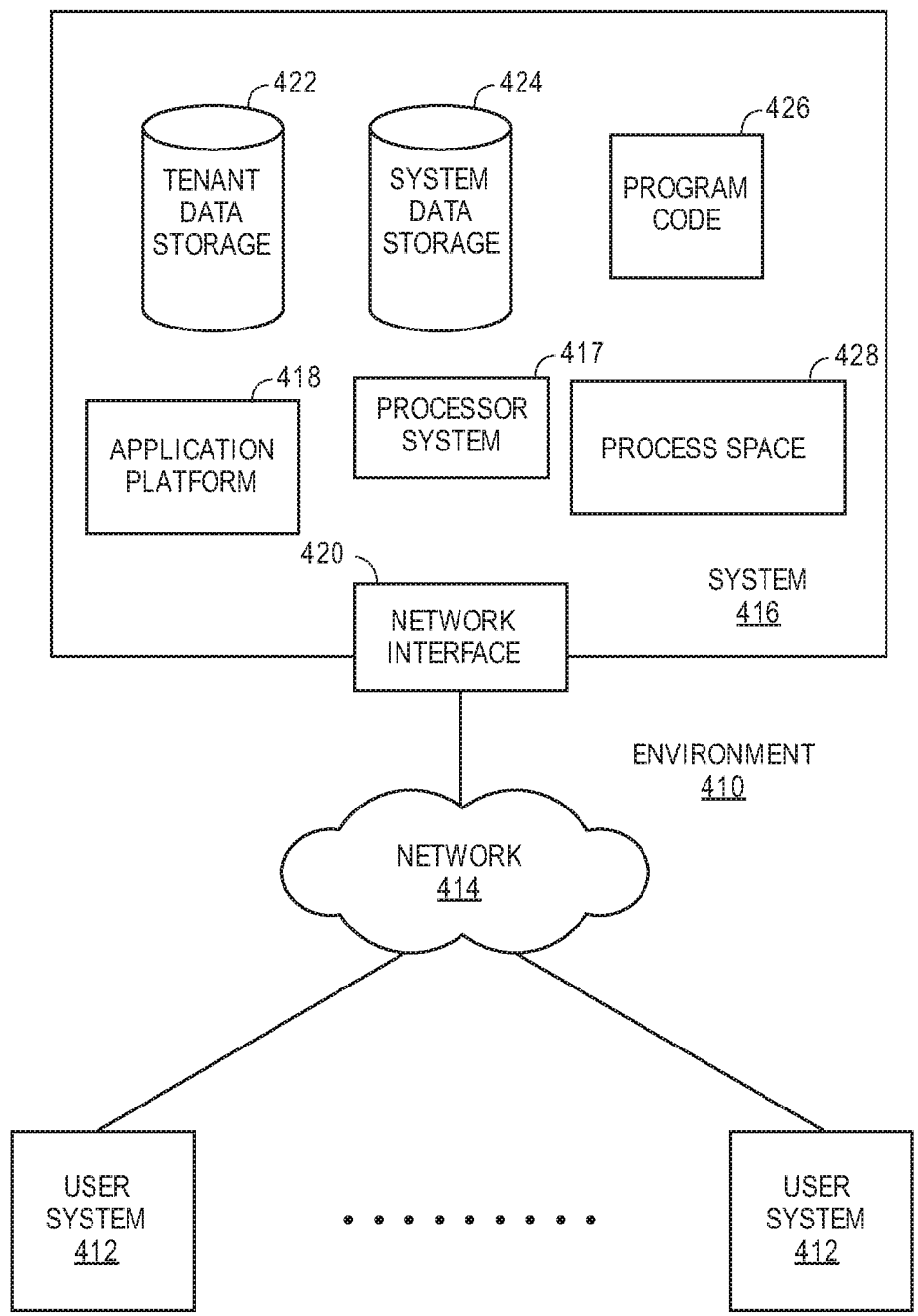
FIG. 4 illustrates a block diagram of an on-demand services environment wherein an on-demand database service might be provided.

FIG. 4 illustrates a block diagram of an environment 410 wherein an on-demand database service might be used. Environment 410 may include user systems 412, network 414, system 416, processor system 417, application platform 418, network interface 420, tenant data storage 422, system data storage 424, program code 426, and process space 428. In other embodiments, environment 410 may not have all of the components listed and/or may have other elements instead of, or in addition to, those listed above.

Environment 410 is an environment in which an on-demand database service exists. User system 412 may be any machine or system that is used by a user to access a database user system. For example, any of user systems 412 can be a handheld computing device, a mobile phone, a laptop computer, a work station, and/or a network of computing devices. As illustrated in herein FIG. 4 (and in more detail in FIG. 5) user systems 412 might interact via a network 414 with an on-demand database service, which is system 416.

An on-demand database service, such as system 416, is a database system that is made available to outside users that do not need to necessarily be concerned with building and/or maintaining the database system, but instead may be available for their use when the users need the database system (e.g., on the demand of the users). Some on-demand database services may store information from one or more tenants stored into tables of a common database image to form a multi-tenant database system (MTS). Accordingly, "on-demand database service 416" and "system 416" will be used interchangeably herein. A database image may include one or more database objects. A relational database management system (RDMS) or the equivalent may execute storage and retrieval of information against the database object(s). Application platform 418 may be a framework that allows the applications of system 416 to run, such as the hardware and/or software, e.g., the operating system. In an embodiment, on-demand database service 416 may include an application platform 418 that enables creation, managing and executing one or more applications developed by the provider of the on-demand database service, users accessing the on-demand database service via user systems 412, or third party application developers accessing the on-demand database service via user systems 412.

The users of user systems 412 may differ in their respective capacities, and the capacity of a particular user system 412 might be entirely determined by permissions (permission levels) for the current user. For example, where a salesperson is using a particular user system 412 to interact with system 416, that user system has the capacities allotted to that salesperson. However, while an administrator is using that user system to interact with system 416, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level.

Network 414 is any network or combination of networks of devices that communicate with one another. For example, network 414 can be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network, such as the global internetwork of networks often referred to as the "Internet" with a capital "I," that network will be used in many of the examples herein. However, it should be understood that the networks that one or more implementations might use are not so limited, although TCP/IP is a frequently implemented protocol.

User systems 412 might communicate with system 416 using TCP/IP and, at a higher network level, use other common Internet protocols to communicate, such as HTTP, FTP, AFS, WAP, etc. In an example where HTTP is used, user system 412 might include an HTTP client commonly referred to as a "browser" for sending and receiving HTTP messages to and from an HTTP server at system 416. Such an HTTP server might be implemented as the sole network interface between system 416 and network 414, but other techniques might be used as well or instead. In some implementations, the interface between system 416 and network 414 includes load sharing functionality, such as round-robin HTTP request distributors to balance loads and distribute incoming HTTP requests evenly over a plurality of servers. At least as for the users that are accessing that server, each of the plurality of servers has access to the MTS' data; however, other alternative configurations may be used instead.

In one embodiment, system 416, shown in FIG. 4, implements a web-based customer relationship management (CRM) system. For example, in one embodiment, system 416 includes application servers configured to implement and execute CRM software applications as well as provide related data, code, forms, webpages and other information to and from user systems 412 and to store to, and retrieve from, a database system related data, objects, and Webpage content. With a multi-tenant system, data for multiple tenants may be stored in the same physical database object, however, tenant data typically is arranged so that data of one tenant is kept logically separate from that of other tenants so that one tenant does not have access to another tenant's data, unless such data is expressly shared. In certain embodiments, system 416 implements applications other than, or in addition to, a CRM application. For example, system 416 may provide tenant access to multiple hosted (standard and custom) applications, including a CRM application. User (or third party developer) applications, which may or may not include CRM, may be supported by the application platform 418, which manages creation, storage of the applications into one or more database objects and executing of the applications in a virtual machine in the process space of the system 416.

One arrangement for elements of system 416 is shown in FIG. 4, including a network interface 420, application platform 418, tenant data storage 422 for tenant data 423, system data storage 424 for system data 425 accessible to system 416 and possibly multiple tenants, program code 426 for implementing various functions of system 416, and a process space 428 for executing MTS system processes and tenant-specific processes, such as running applications as part of an application hosting service. Additional processes that may execute on system 416 include database indexing processes.

Several elements in the system shown in FIG. 4 include conventional, well-known elements that are explained only briefly here. For example, each user system 412 could include a desktop personal computer, workstation, laptop, PDA, cell phone, or any wireless access protocol (WAP) enabled device or any other computing device capable of interfacing directly or indirectly to the Internet or other network connection. User system 412 typically runs an HTTP client, e.g., a browsing program, such as Microsoft's Internet Explorer browser, Netscape's Navigator browser, Opera's browser, or a WAP-enabled browser in the case of a cell phone, PDA or other wireless device, or the like, allowing a user (e.g., subscriber of the multi-tenant database system) of user system 412 to access, process and view information, pages and applications available to it from system 416 over network 414. Each user system 412 also typically includes one or more user interface devices, such as a keyboard, a mouse, trackball, touch pad, touch screen, pen or the like, for interacting with a graphical user interface (GUI) provided by the browser on a display (e.g., a monitor screen, LCD display, etc.) in conjunction with pages, forms, applications and other information provided by system 416 or other systems or servers. For example, the user interface device can be used to access data and applications hosted by system 416, and to perform searches on stored data, and otherwise allow a user to interact with various GUI pages that may be presented to a user. As discussed above, embodiments are suitable for use with the Internet, which refers to a specific global internetwork of networks. However, it should be understood that other networks can be used instead of the Internet, such as an intranet, an extranet, a virtual private network (VPN), a non-TCP/IP based network, any LAN or WAN or the like.

According to one embodiment, each user system 412 and all of its components are operator configurable using applications, such as a browser, including computer code run using a central processing unit such as an Intel Pentium® processor or the like. Similarly, system 416 (and additional instances of an MTS, where more than one is present) and all of their components might be operator configurable using application(s) including computer code to run using a central processing unit such as processor system 417, which may include an Intel Pentium® processor or the like, and/or multiple processor units. A computer program product embodiment includes a machine-readable storage medium (media) having instructions stored thereon/in which can be used to program a computer to perform any of the processes of the embodiments described herein. Computer code for operating and configuring system 416 to intercommunicate and to process webpages, applications and other data and media content as described herein are preferably downloaded and stored on a hard disk, but the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any type of media or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for implementing embodiments can be implemented in any programming language that can be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

According to one embodiment, each system 416 is configured to provide webpages, forms, applications, data and media content to user (client) systems 412 to support the access by user systems 412 as tenants of system 416. As such, system 416 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to include a computer system, including processing hardware and process space(s), and an associated storage system and database application (e.g., OODBMS or RDBMS) as is well known in the art. It should also be understood that "server system" and "server" are often used interchangeably herein. Similarly, the database object described herein can be implemented as single databases, a distributed database, a collection of distributed databases, a database with redundant online or offline backups or other redundancies, etc., and might include a distributed database or storage network and associated processing intelligence.

Figure 5:
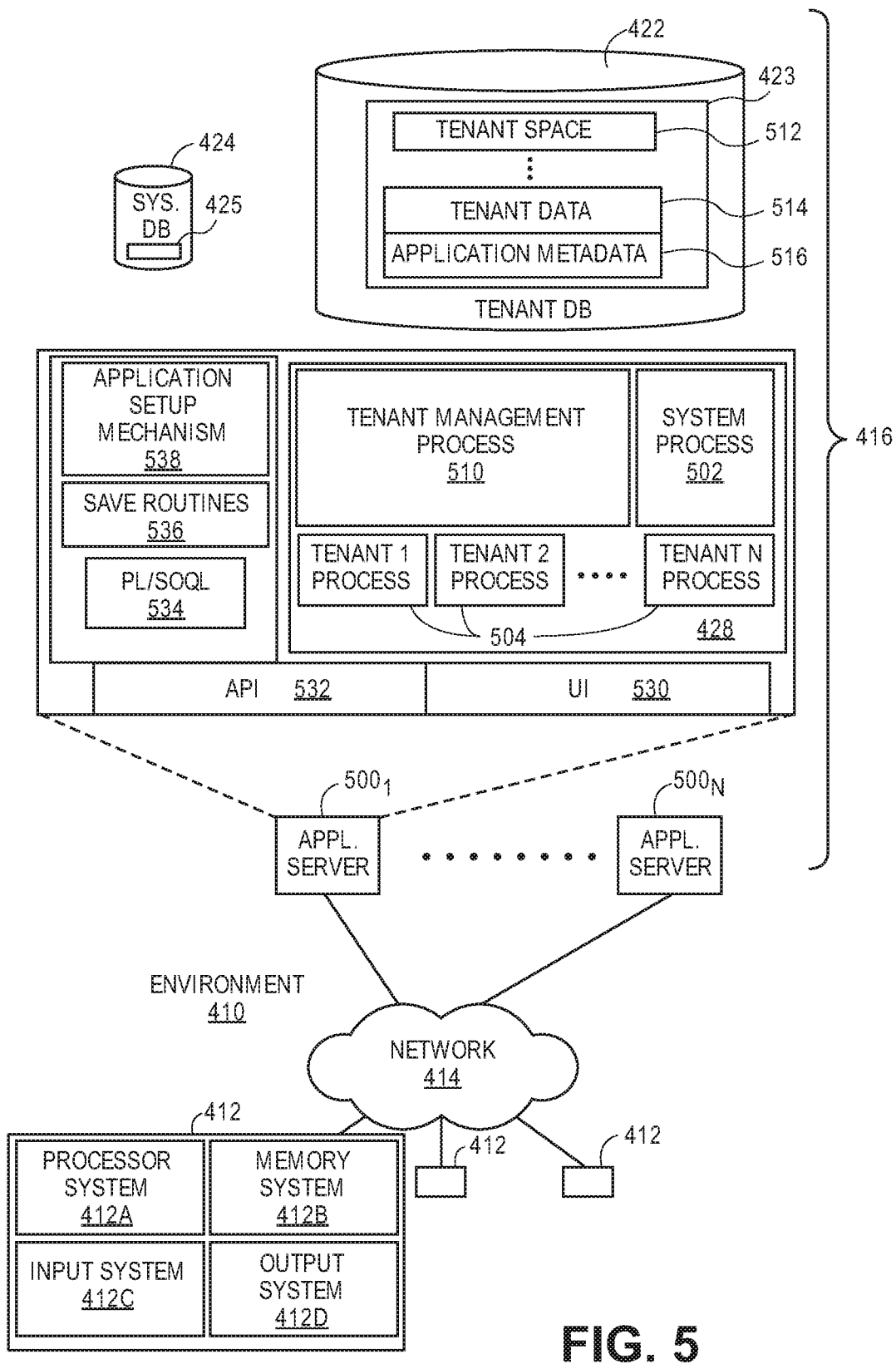
FIG. 5 illustrates a block diagram of an on-demand services environment wherein an on-demand database service might be provided.

FIG. 5 also illustrates environment 410. However, in FIG. 5 elements of system 416 and various interconnections in an embodiment are further illustrated. FIG. 5 shows that user system 412 may include processor system 412A, memory system 412B, input system 412C, and output system 412D. FIG. 5 shows network 414 and system 416. FIG. 5 also shows that system 416 may include tenant data storage 422, tenant data 423, system data storage 424, system data 425, User Interface (UI) 530, Application Program Interface (API) 532, PL/SOQL 534, save routines 536, application setup mechanism 538, applications servers $500_1$-$400_N$, system process space 502, tenant process spaces 504, tenant management process space 510, tenant storage space 512, tenant data 514, and application metadata 516. In other embodiments, environment 410 may not have the same elements as those listed above and/or may have other elements instead of, or in addition to, those listed above.

User system 412, network 414, system 416, tenant data storage 422, and system data storage 424 were discussed above in FIG. 4. Regarding user system 412, processor system 412A may be any combination of one or more processors. Memory system 412B may be any combination of one or more memory devices, short term, and/or long term memory. Input system 412C may be any combination of input devices, such as one or more keyboards, mice, trackballs, scanners, cameras, and/or interfaces to networks. Output system 412D may be any combination of output devices, such as one or more monitors, printers, and/or interfaces to networks. As shown by FIG. 5, system 416 may include a network interface 420 (of FIG. 4) implemented as a set of HTTP application servers 500, an application platform 418, tenant data storage 422, and system data storage 424. Also shown is system process space 502, including individual tenant process spaces 504 and a tenant management process space 510. Each application server 500 may be configured to tenant data storage 422 and the tenant data 423 therein, and system data storage 424 and the system data 425 therein to serve requests of user systems 412. The tenant data 423 might be divided into individual tenant storage spaces 512, which can be either a physical arrangement and/or a logical arrangement of data. Within each tenant storage space 512, tenant data 514 and application metadata 516 might be similarly allocated for each user. For example, a copy of a user's most recently used (MRU) items might be stored to tenant data 514. Similarly, a copy of MRU items for an entire organization that is a tenant might be stored to tenant storage space 512. A UI 530 provides a user interface and an API 532 provides an application programmer interface to system 416 resident processes to users and/or developers at user systems 412. The tenant data and the system data may be stored in various databases, such as one or more Oracle™ databases.

Application platform 418 includes an application setup mechanism 538 that supports application developers' creation and management of applications, which may be saved as metadata into tenant data storage 422 by save routines 536 for execution by subscribers as one or more tenant process spaces 504 managed by tenant management process 510 for example. Invocations to such applications may be coded using PL/SOQL 534 that provides a programming language style interface extension to API 532. A detailed description of some PL/SOQL language embodiments is discussed in commonly owned U.S. Pat. No. 7,730,478 entitled, "Method and System for Allowing Access to Developed Applicants via a Multi-Tenant Database On-Demand Database Service", issued Jun. 1, 2010 to Craig Weissman, which is incorporated in its entirety herein for all purposes. Invocations to applications may be detected by one or more system processes, which manage retrieving application metadata 516 for the subscriber making the invocation and executing the metadata as an application in a virtual machine.

Each application server 500 may be communicably coupled to database systems, e.g., having access to system data 425 and tenant data 423, via a different network connection. For example, one application server $500_1$ might be coupled via the network 414 (e.g., the Internet), another application server $500_{N-1}$ might be coupled via a direct network link, and another application server $500_N$ might be coupled by yet a different network connection. Transfer Control Protocol and Internet Protocol (TCP/IP) are typical protocols for communicating between application servers 500 and the database system. However, it will be apparent to one skilled in the art that other transport protocols may be used to optimize the system depending on the network interconnect used.

In certain embodiments, each application server 500 is configured to handle requests for any user associated with any organization that is a tenant. Because it is desirable to be able to add and remove application servers from the server pool at any time for any reason, there is preferably no server affinity for a user and/or organization to a specific application server 500. In one embodiment, therefore, an interface system implementing a load balancing function (e.g., an F5 Big-IP load balancer) is communicably coupled between the application servers 500 and the user systems 412 to distribute requests to the application servers 500. In one embodiment, the load balancer uses a least connections algorithm to route user requests to the application servers 500. Other examples of load balancing algorithms, such as round robin and observed response time, also can be used. For example, in certain embodiments, three consecutive requests from the same user could hit three different application servers 500, and three requests from different users could hit the same application server 500. In this manner, system 416 is multi-tenant, wherein system 416 handles storage of, and access to, different objects, data and applications across disparate users and organizations.

As an example of storage, one tenant might be a company that employs a sales force where each salesperson uses system 416 to manage their sales process. Thus, a user might maintain contact data, leads data, customer follow-up data, performance data, goals and progress data, etc., all applicable to that user's personal sales process (e.g., in tenant data storage 422). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 416 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant specific data, system 416 might also maintain system level data usable by multiple tenants or other data. Such system level data might include industry reports, news, postings, and the like that are sharable among tenants.

In certain embodiments, user systems 412 (which may be client systems) communicate with application servers 500 to request and update system-level and tenant-level data from system 416 that may require sending one or more queries to tenant data storage 422 and/or system data storage 424. System 416 (e.g., an application server 500 in system 416) automatically generates one or more SQL statements (e.g., one or more SQL queries) that are designed to access the desired information. System data storage 424 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for Account, Contact, Lead, and Opportunity data, each containing pre-defined fields. It should be understood that the word "entity" may also be used interchangeably herein with "object" and "table".

In some multi-tenant database systems, tenants may be allowed to create and store custom objects, or they may be allowed to customize standard entities or objects, for example by creating custom fields for standard objects, including custom index fields. U.S. patent application Ser. No. 10/817,161, filed Apr. 2, 2004, entitled "Custom Entities and Fields in a Multi-Tenant Database System", and which is hereby incorporated herein by reference, teaches systems and methods for creating custom objects as well as customizing standard objects in a multi-tenant database system. In certain embodiments, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

While the invention has been described in terms of several embodiments, those skilled in the art will recognize that the invention is not limited to the embodiments described, but can be practiced with modification and alteration within the spirit and scope of the appended claims. The description is thus to be regarded as illustrative instead of limiting.

What is claimed is:

1. A method comprising:
    granting access to a secure computing environment, with one or more computing devices utilizing a browser application, wherein access is granted in response to an authentication process a result of which an access token is provided by a remote authorization server;
    refreshing the access token, with the one or more computing devices, via a browser extension within a sandbox to provide a secure silent refresh without explicit user interaction utilizing the authentication information for a session during a period of validity for the session by sending at least a portion of authentication information for the session to the remote authorization server to cause the access token to be refreshed;
    granting continued access to the secure computing environment, with the one or more computing devices, utilizing the refreshed access token.

2. The method of claim 1 wherein the authentication information comprises a user name and password.

3. The method of claim 1 wherein the authentication information comprises multi-factor authentication.

4. The method of claim 1 wherein the session is valid for a longer time period than the access token.

5. The method of claim 1 wherein the access token is acquired utilizing OAuth 2 compliant protocols.

6. The method of claim 1 wherein the secure computing environment comprises an on-demand services environment.

7. The method of claim 6 wherein the on-demand services environment comprises a multitenant database environment.

8. A non-transitory computer readable storage medium having stored thereon instructions that, when executed by one or more processors, cause the one or more processors to:
    grant access to a secure computing environment, with one or more computing devices utilizing a browser application, wherein access is granted in response to an authentication process a result of which an access token is provided by a remote authorization server;
    refresh the access token, with the one or more computing devices via a browser extension within a sandbox to provide a secure silent refresh without explicit user interaction utilizing the authentication information for a session during a period of validity for the session by sending at least a portion of authentication information for the session to the remote authorization server to cause the access token to be refreshed;
    grant continued access to the secure computing environment, with the one or more computing devices, utilizing the refreshed access token.

9. The non-transitory computer readable storage medium of claim 8 wherein the authentication information comprises a user name and password.

10. The non-transitory computer readable storage medium of claim 8 wherein the authentication information comprises multi-factor authentication.

11. The non-transitory computer readable storage medium of claim 8 wherein the session is valid for a longer time period than the access token.

12. The non-transitory computer readable storage medium of claim 8 wherein the access token is acquired utilizing OAuth 2 compliant protocols.

13. The non-transitory computer readable storage medium of claim 8 wherein the secure computing environment comprises an on-demand services environment.

14. The non-transitory computer readable storage medium of claim 8, wherein the on-demand services environment comprises a multitenant database environment.

15. A system comprising:

a memory device;

one or more processors coupled with the memory device, the one or more processors to grant access to a secure computing environment, with one or more computing devices utilizing a browser application, wherein access is granted in response to an authentication process a result of which an access token is provided by a remote authorization server, to refresh the access token, with the one or more computing devices, via a browser extension within a sandbox to provide a secure silent refresh without explicit user interaction utilizing the authentication information for a session during a period of validity for the session by sending at least a portion of authentication information for the session to the remote authorization server to cause the access token to be refreshed, and to grant continued access to the secure computing environment, with the one or more computing devices, utilizing the refreshed access token.

16. The system of claim 15 wherein the authentication information comprises a user name and password.

17. The system of claim 15 wherein the authentication information comprises multi-factor authentication.

18. The system of claim 15 wherein the session is valid for a longer time period than the access token.

19. The system of claim 15 wherein the access token is acquired utilizing OAuth 2 compliant protocols.

20. The system of claim 15 wherein the secure computing environment comprises a multitenant database environment.

* * * * *

UNITED STATES PATENT AND TRADEMARK OFFICE
CERTIFICATE OF CORRECTION

PATENT NO. : 11,153,294 B2
APPLICATION NO. : 16/391084
DATED : October 19, 2021
INVENTOR(S) : Olga Khylkouskaya and Aleksey Kolesnik It is certified that error appears in the above-identified patent and that said Letters Patent is hereby corrected as shown below:

In the Claims

For Claim 1, in Column 12 Line 14, please change "server to cause the access token to be refreshed;" to the following: ""server to cause the access token to be refreshed; and"

For Claim 8, in Column 12 Line 46, please change "cause the access token to be refreshed;" to the following: "cause the access token to be refreshed; and"

Signed and Sealed this
Twelfth Day of April, 2022

Drew Hirshfeld
*Performing the Functions and Duties of the*
*Under Secretary of Commerce for Intellectual Property and*
*Director of the United States Patent and Trademark Office*